US006807415B2

(12) United States Patent
Sato

(10) Patent No.: US 6,807,415 B2
(45) Date of Patent: Oct. 19, 2004

(54) MOBILE COMMUNICATION SYSTEM AND PROGRAM TRANSMISSION METHOD

(75) Inventor: Naoki Sato, Tokyo (JP)

(73) Assignee: NEC Corporation, Tokyo (JP)

( * ) Notice: Subject to any disclaimer, the term of this patent is extended or adjusted under 35 U.S.C. 154(b) by 468 days.

(21) Appl. No.: 09/778,825

(22) Filed: Feb. 8, 2001

(65) Prior Publication Data
US 2001/0014602 A1 Aug. 16, 2001

(30) Foreign Application Priority Data
Feb. 10, 2000 (JP) ....................................... 2000-034097

(51) Int. Cl.$^7$ .............................................. H04M 3/00
(52) U.S. Cl. .................................. 455/420; 455/412.1
(58) Field of Search ............................. 455/419, 456.5, 455/456.6, 560, 561, 566, 95, 418, 420, 412.1, 517

(56) References Cited

U.S. PATENT DOCUMENTS

| 5,638,412 A | * | 6/1997 | Blakeney et al. | ........... 375/377 |
| 6,035,339 A | * | 3/2000 | Agraharam et al. | ........ 709/246 |
| 6,104,924 A | * | 8/2000 | Shirai | ......................... 455/418 |
| 6,195,546 B1 | * | 2/2001 | Leung et al. | ................ 455/419 |
| 6,421,726 B1 | * | 7/2002 | Kenner et al. | .............. 709/225 |
| 6,625,447 B1 | * | 9/2003 | Rossmann | ............. 340/825.27 |

FOREIGN PATENT DOCUMENTS

| JP | A 11-136394 | 5/1995 |
| JP | A 11-250009 | 9/1999 |
| WO | 97/16938 | 5/1997 |
| WO | 97/29606 | 8/1997 |
| WO | 98/06221 | 2/1998 |

OTHER PUBLICATIONS

*Wireless Application Protocol—Wireless Telephony Application Specification Version 1.1*, WAP WTA, 1999, Wireless application Protocol Forum, Ltd, pp. 1–39, XP–002184984.
Lars Hagen et al., "Impacts of Mobile Agent Technology on Mobile Communication System Evolution, "*IEEE Personal Commications*, 1998, pp. 56–69.

* cited by examiner

Primary Examiner—Nguyen T. Vo
Assistant Examiner—Alemayehu Behulu
(74) Attorney, Agent, or Firm—Young & Thompson

(57) ABSTRACT

Disclosed is a mobile communication system including a mobile station and a server to communicate with the mobile station through a base station. The mobile station has: notification means for notifying data processing ability to the server beforehand; reception means for receiving a program and data from the server; and processing means for processing service information from the server using the program and data received from the server. The server has: storage means for storing the data processing ability from the mobile station; determination means for, according to the information stored in the storage means, determining whether the mobile station can process the service information or not; and transmission means for, when the result of the determination by the determination means is NO (negative), transmitting the program and data for processing the service information along with the service information to the mobile station.

8 Claims, 6 Drawing Sheets

US 6,807,415 B2

MOBILE COMMUNICATION SYSTEM AND PROGRAM TRANSMISSION METHOD

FIELD OF THE INVENTION

The present invention relates to a mobile communication system that has a function to allow the user to browse text information, image information, and multimedia information. More particularly, the present invention relates to a mobile communication system and a program transmission method that allow a program and data, which is not stored in a system-relevant mobile station, to be downloaded from a base-station server to the mobile station according to need, thereby providing the mobile station with a new processing function.

BACKGROUND OF THE INVENTION

An example of a conventional mobile communication system is disclosed in Japanese Patent Application Laid-Open No. 11-75257. This system is provided with two means. One is means for, in response to a request issued from a mobile station (cellular phone), downloading a program and data from a server equipped in a base station to the mobile station. The other is means for making the program downloaded available in the mobile station. The conventional mobile communication system thus composed operates as follows. Namely, the user who is using the mobile station gives an operation to download the program and data according to need. According to this user's operation, the program and data is downloaded from the base-station server to the mobile station. Thereby, an additional service becomes available in the mobile station.

The problem of the above-described conventional mobile communication system is that the user of the mobile station has to give the operation to download the program and data to the mobile station. One reason of the problem is that there is no notification means for notifying, mutually between the mobile station and the base-station server having the program and data, whether the mobile station has a processing function needed to perform the addition service or not. The other is that, in the mobile station or the base-station server, there is no determination means for determining whether the mobile station has the necessary processing function or not.

SUMMARY OF THE INVENTION

An object of the invention is to provide a mobile communication system and a program transmission method that allow a program and data needed to perform additional services in a mobile station to be downloaded automatically and surely to the mobile station without the user's operation.

The invention will hereafter be explained using FIGS. 1 and 2. First, according to a first aspect of the present invention, in FIG. 1, there is provided a mobile communication system, including a mobile station 1 and a server 2 performing a communication with the mobile station 1 through a base station, wherein the mobile station 1 has provided therein notification means 11 that notifies mobile station's processing ability to the server 2 beforehand; reception means 12 that receives a program and data from the server 2; program and data hold means 13 holds the program and data received from reception means 12: execution means 14 executes built-in program and program held in hold means 13, if needed execution means 14 accesses data held in hold means 13; and processing means 15 that processes service information the mobile station receives from the server 2 using the program and data the mobile station receives from the server 2, while the server 2 has provided therein storage means (mobile-station side processing ability hold means) 22 that stores therein the data processing ability that has been notified from the mobile station 1; determination means (mobile-station side processing ability confirmation means) 23 that receives a request for the service information made from the mobile station 1 and that, according to the information stored in the storage means 22, determines whether the mobile station 1 can process the service information; and transmission means 26 that, in the case the result of the determination made by the determination means 23 is NO (negative), transmits the service information to the mobile station 1; and transmission means (download means) 24 that transmits the program and data for processing the service information.

Also, according to a second aspect of the present invention, in FIG. 2, there is provided a mobile communication system, including a mobile station 3 and a server 4 performing a communication with the mobile station 3 through a base station, wherein the mobile station 3 has provided therein reception means (service information receive means) 37 that receives service information from the server 4, reception means 33 that receives the program and data for processing the service information from the server 4; processing ability confirmation means 32 that determines whether the mobile station 3 can process the service information received from the server 4 using the information held in processing ability information hold means 31 and that, in the case the result of the determination is NO (negative), requests the server 4 to transmit the program and data for processing the service information, and processing means 36 that processes the service information using the program and data the mobile station 3 has received from the server 4, while the server 4 has provided therein first transmission means 44 that, upon receipt of the request from the mobile station 3, transmits the service information; and second transmission means (download means) 42 that, upon receipt of the request from the mobile station 3, transmits the program and data.

According to a third aspect of the present invention, in FIG. 1, there is provided a program transmission method performing a program transmission between a mobile station 1 and a server 2 performing communication with the mobile station 1 via a base station, comprising a step (executed by processing ability notification means 11) that the mobile station 1 notifies the data processing ability to the server 2 beforehand; a step (executed by service information receive means 16) that when in the mobile station 1 a request for service information has occurred therefrom, the mobile station 1 transmits a request for the server 2 to transmit the service information; a step (executed by mobile-station side processing ability confirmation means 23) that the server 2 receives this request and, according to the data processing ability of the mobile station 1 the server 2 is notified of beforehand, determines whether the mobile station 1 can process the service information; and a step (executed by download means 24) that, in the case the result of the determination is NO (negative), the server 2 transmits the program and data for processing the service information along with this service information.

According to a fourth aspect of the present invention, in FIG. 1, there is provided a program transmission method performing a program transmission between a mobile station 1 and a server 2 performing communication with the mobile station 1 via a base station, comprising a step (executed by processing ability notification means 11) that the mobile station 1 notifies the data processing ability to the server 2 beforehand; a step (executed by service information receive means 16) that when in the mobile station 1 a request for service information has occurred therefrom, the mobile station transmits a request for the server 2 to transmit the service information; a step (executed by service information transmission means 26) that the server 2 receives this request; a step (executed by mobile-station side processing ability confirmation means 23) that, according to the data processing ability of the mobile station the server 2 is notified or beforehand, the server 2 determines whether the mobile station 1 can process the service information; a step (executed by download means 24) that, in the case the result of the determination is NO (negative), the server 2 transmits the program and data for processing the service information; a step program and data hold means 13) that the mobile station 1 stores into its internal storage means the program and data that have been transmitted thereto, a step (executed by service information transmission means 26) that the server 2 thereafter transmits the service information to the mobile station 1; a step (executed by service information receive means 16) that the mobile station 1 receives the service information; and a step (executed by service information processing means 15) that the mobile station 1 processes the service information using the program and data that have been already transmitted from the server 2.

According to a fifth aspect of the present invention, in FIG. 2, there is provided a program transmission method performing a program transmission between a mobile station 3 and a server 4 performing communication with the mobile station 3 via a base station, comprising a step (executed by processing ability information hold means 31) that the mobile station 3 stores therein its own data processing ability beforehand; a step (executed by processing ability confirmation means 32) that when in the mobile station 3 a request for service information has occurred therefrom the mobile station 3, according to the data processing ability the mobile station 3 stores therein beforehand, determines whether the mobile station 3 can process the requested service information; a step (executed by processing ability confirmation means 32) that, in the case the result of the determination is NO (negative), the mobile station 3 requests the server 4 to transmit the program and data for processing the service information along with this service information; a step (executed by download request acceptance means 41) that the server 4 receives this request; and a step (executed by download means 12) that the server 4 transmits the program and data for processing the service information along with this requested service information to the mobile station 3.

According to a sixth aspect of the present invention, there is provided a program transmission method performing a program transmission between a mobile station 3 and a server 4 performing communication with the mobile station 3 via a base station, comprising a step (executed by processing ability information hold means 31) that the mobile station 3 stores therein its own data processing ability beforehand; a step (executed by service information receive means 37) that when in the mobile station 3 a request for service information has occurred therefrom, the mobile station 3 transmits to the server 4 a request for the server 4 to transmit the service information; a step (executed by service information transmission means 44) that the server 4 receives this request and transmits the requested service information to the mobile station 3; a step (executed by service information receive means 37) that the mobile station 3 receives the service information; a step (executed by processing ability confirmation means 32) that the mobile station 3, according to the data processing ability the mobile station 3 stores therein beforehand, determines whether the mobile station 3 can process the service information; a step (executed by processing ability confirmation means 32) that, in the case the result of the determination is NO (negative), the mobile station 3 requests the server 4 to transmit the program and data for processing the service information; a step (executed by download request acceptance means 41) that the server 4 receives this request from the mobile station 3; a step (executed by download means 42) that the server 4 transmits the program and data to the mobile station 3; and a step (executed by service information processing means 36) that the mobile station 3 processes the service information using the program and data that have been transmitted thereto.

BRIEF DESCRIPTION OF THE DRAWINGS

The invention will be explained in more detail in conjunction with the appended drawings, wherein.

DETAILED DESCRIPTION OF THE PREFERRED EMBODIMENTS

Figure 1:
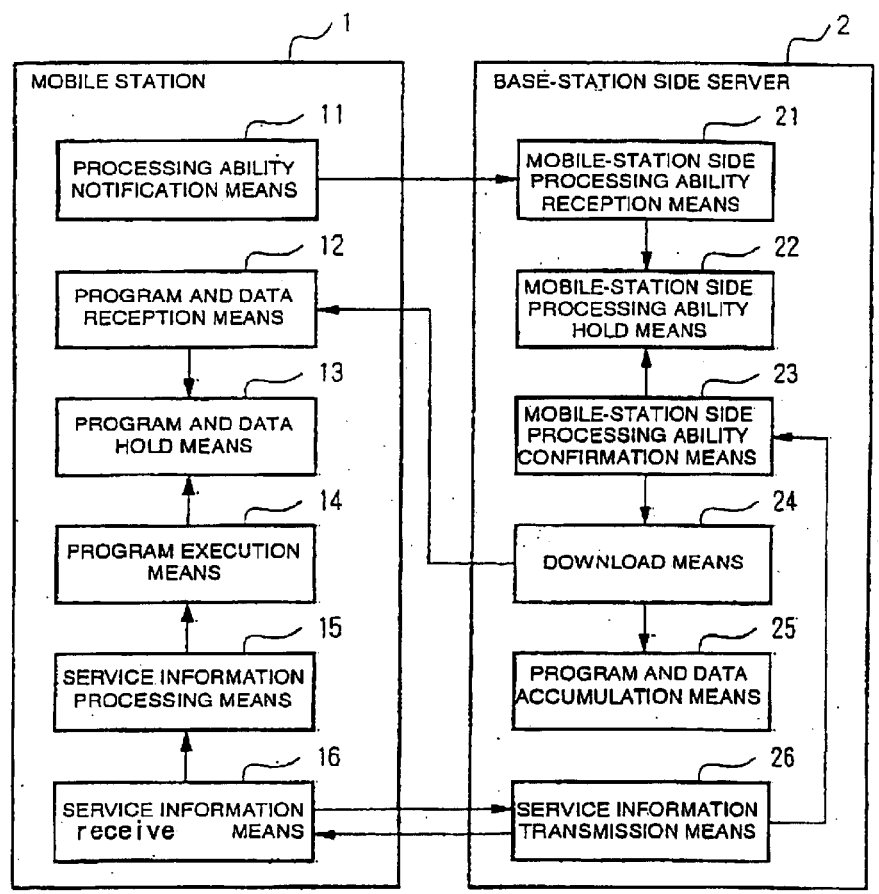
FIG. 1 is a block diagram illustrating a construction of the invention.
Figure 2:
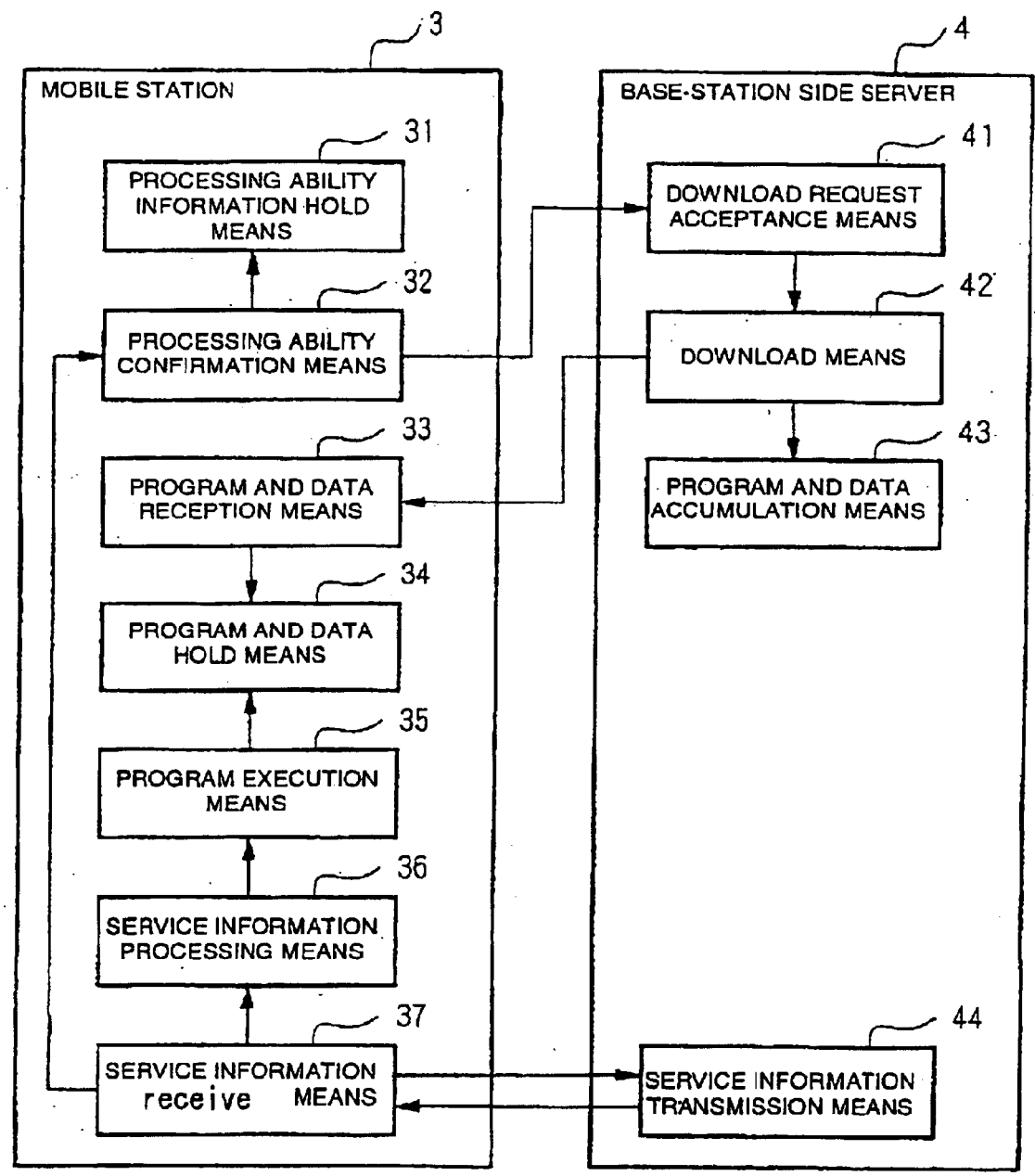
FIG. 2 is a block diagram illustrating another construction of the invention.
Figure 3:
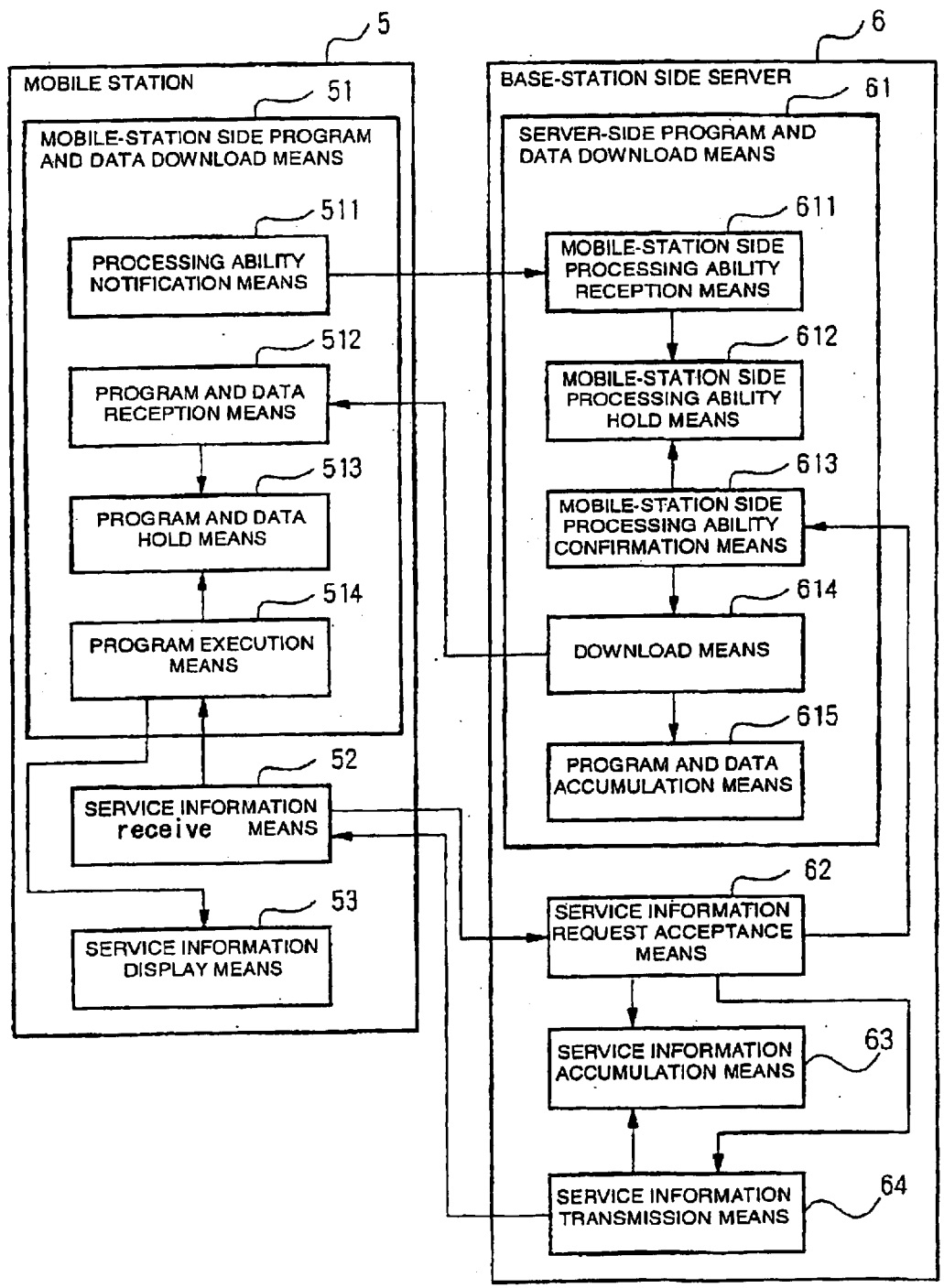
FIG. 3 is a block diagram illustrating the construction of a first preferred embodiment of the invention.

An embodiment of a mobile communication system and program transmission method of the present invention will hereafter be explained with reference to the drawings. First, the first preferred embodiment of the invention illustrated in FIG. 3 will be explained in detail with reference to the drawing. In FIG. 3, the mobile communication system according to this first embodiment is constructed of a mobile station 5 that comprises mobile-station side program and data download means 51, service information receive means 52, and service information display means 53, and a base-station side server 6 that comprises server-side program and data download means 61 for performing download of a program and data, service information request acceptance means 62, service information accumulation means 63, and service information transmission means 64.

Also, the mobile-station side program and data download means 51 includes processing ability notification means 511, program and data reception means 512, program and data hold means 513, and program execution means 514. Further, the server-side program and data download means 61 includes mobile-station side processing ability reception means 611, mobile-station side processing ability hold means 612, mobile-station side processing ability confirmation means 613, download means 614, and program and data accumulation means 615.

The respective constituent elements are explained as follows. The processing ability notification means 511 outputs to the base-station server 6 the processing ability information that represents the processing ability possessed by the mobile station 5. The mobile-station side processing ability reception means 611 receives the processing ability information of the mobile station that the processing ability notification means 511 notifies. The mobile-station side processing ability hold means 612 has scored therein the information that has been received by the mobile-station side processing ability reception means 611. The mobile-station side processing ability confirmation means 613 performs comparison between the contents of the service information the mobile station is requesting to transmit and the processing ability information of the mobile station that is held in the mobile-station side processing ability hold means 612. When it has been resultantly determined that the mobile station is unable to process the service information. The mobile-station side processing ability confirmation means 613 outputs a download instruction signal On the other hand, the program and data accumulation means 615 has stored therein the program and data necessary for processing the service information on the side of the mobile station 5. The download means 614, according to the download instruction signal from the mobile-station side processing ability confirmation means 613, takes out from the program and data accumulation means 615 the program and data necessary for the mobile station 5 to process the service information and transmits it to the mobile station 5.

The program and data reception means 512 receives the program and data transmitted from the download means 614 and causes them to be stored in the program and data hold means 513 and held therein. The service information receive means 52 transmits a request to transmit the service information, to the base-station side server 6 and simultaneously supplies to the program execution means 514 the service information that has been return-transmitted to the receive means 52 itself. The program execution means 514 executes the program held in the program and data hold means 513, and performs processing of the service information and hands the processed result to the service information display means 53. At this time, as the necessity arises, the program execution means 514 also refers to the data held in the program and data hold means 513. The service information display means 53 displays the service information. On the other hand, the service information accumulation means 63 has stored therein the service information that can be served to the user and the communication of that can be made between the base-station side server 6 and the mobile station 5. The service information request acceptance means 62 procures from the service information accumulation means 63 the service information the service information receives means 52 instructs to transmit by its request. And, the service information request acceptance means 62 confirms the contents of the service information. The service information request acceptance means 62 notifies the confirmed service information to the mobile-station side processing ability confirmation means 613 and simultaneously instructs the service information transmission means 64 to transmit the requested service information to the mobile station 5. The service information transmission means 64 takes out from the service information accumulation means 63 the service information that the mobile station 5 requests to transmit and transmits this service information to the mobile station 5.

Figure 4:
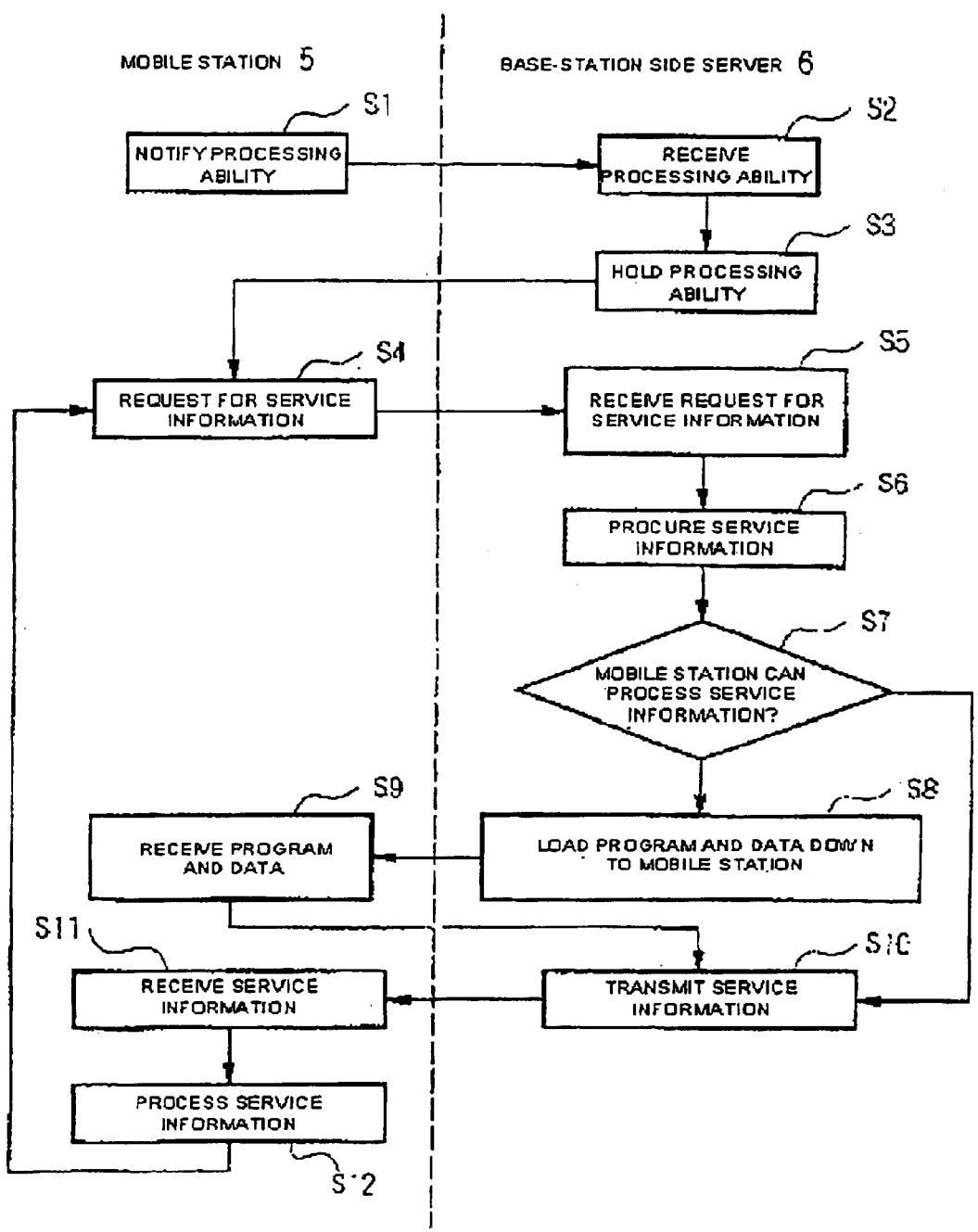
FIG. 4 is a flow chart illustrating the operation of the first embodiment.

Next, with reference to the flow chart of FIG. 4, a detailed explanation will be given of the operation of the above-described embodiment. Here, reference is made to a case where character-code conversion program and data are downloaded from the base-station side server 6 to the mobile station 5 that can only display the service information that is described in JIS codes. In this flow, by such download, the service information that is described in EUC on the server is made displayable on the mobile station.

First, when the mobile station 5 performs its connection to the base-station side server 6, using the processing ability notification means 511 the mobile station 5 notifies to the base-station side server 6 that it can only handle the service information the character information of that is described in JIS codes (step S1). The mobile-station side processing ability reception means 611 of the base-station side server 6 receives the information that has been notified by the mobile station 5, i.e. the information that the mobile station 5 can only handle the service information the character information of that is described in JIS codes (step S2). The reception means 611 stores this information into the mobile-station side processing ability hold means 612 to thereby prepare the information for use made at the time of a determination made in a succeeding step (step S3).

On the other hand, the mobile station 5, by its service information receive means 52, transmits a service information request signal to the base-station side server 6 so that necessary service information is transmitted thereto (step S4). The base-station side server 6 receives the service information request signal from the mobile station 5 by its service information request acceptance means 62 (step S5). The service information request acceptance means 62 gets from the service information accumulation means 63 the service information that the service information request signal instructs to transmit. And, the service information request acceptance means 62 confirms the character codes of the gotten service information. Then, it notifies that the character codes of the service information are EUC codes, to the mobile-station side processing ability confirmation means 613 (step S6).

Next, the mobile-station side processing ability confirmation means 613 compares the following two pieces of information. One is the information that the character codes of the service information are EUC codes. And the other is the information that has been held in the mobile-station side processing ability hold means 612 in step S3 and that indicates that the mobile station 5 can only handle the service information the character information of that is described in JIS codes. Thereby, the confirmation means 613 performs its determination of whether the mobile station 5 can process the service information (step S7).

As a result, in this case, the confirmation means 613 can determine that the mobile station 5 is unable to process the service information described in EUC character codes. And therefore the confirmation means 613 instructs the download means 614 to perform its download to the mobile station 5 of a program and data that are necessary for the mobile station 5 to convert the service information described in EUC codes to the service information described in JIS character codes ("NO" in step S7). The download means 614 takes out from the program and data accumulation means 63 the program and data that are necessary for the mobile station 5 to convert the service information described in EUC character codes to the service information described in JIS codes. Then, the download means 614 downloads those program and data to the mobile station 5 (step S8). The mobile station 5, by its program and data reception means 512, receives the program and data from the base-station side server 6 and stores them into the program and data hold means 513 (step S9).

Next, upon completion of the reception of the program and data by the mobile station 5, the base-station side server 6, by its service information transmission means 64, takes out the service information described in EUC character codes from the service information accumulation means 63 and transmits to the mobile station 5 (step S10). The mobile station 5, by its service information receives means 52, receives the service information and hands it to the program execution means 514 (step S1). Using the program and data for converting the character codes from the EUC codes to the JIS codes that are held in the program and data hold means 513, the program execution means 514 performs character code conversion with respect to the received service information and displays the resulting service information on the service information display means 53 (step S12).

The foregoing has given an explanation of the case where the mobile station cannot process the service information. However, if in step S7 it has been determined that the mobile station 5 can process the service information ("YES" in step S7), the service information transmission means 64 unconditionally takes out the service information described in EUC codes from the service information accumulation means 63. Then, the transmission means 64 transmits it to the mobile station 5 (step S10). The mobile station 5, by its service information receives means 52, receives the service information and hands it to the program execution means 514 (step S11). The program execution means 514 performs its processing of the received service information and displays the resulting service information on the service information display means 53 (step S12) Thereafter, each time a service information request occurs from the mobile station, the same processing starting with the step S4 are executed repeatedly.

Figure 5:
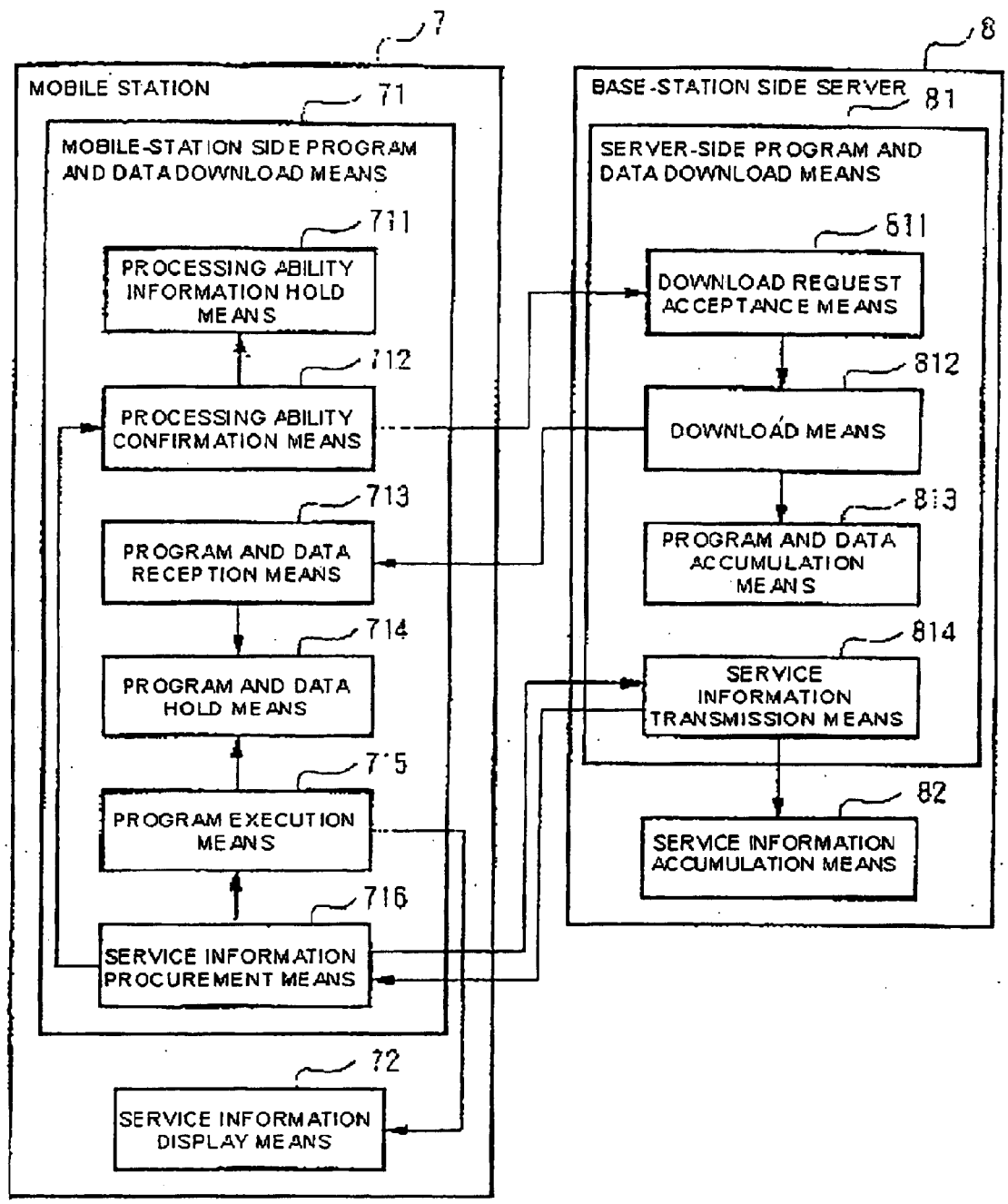
FIG. 5 is a block diagram illustrating the construction of a second preferred embodiment of the invention.

Next, the second preferred embodiment of the invention illustrated in FIG. 5 will be explained in detail with reference to the drawings. In FIG. 5, the mobile communication system according to this second embodiment is constructed of a mobile station 7, which includes mobile-station side program and data download means 71 and service information display means 72, and a base-station side server 8, which includes server side program and data download means 81 and service information accumulation means 82. The mobile-station side program and data download means 71 includes processing ability information hold means 711, processing ability confirmation means 712, program and data reception means 713, program and data hold means 714, program execution means 715, and service information means 716. Further, the server side program and data download means 81 includes download request acceptance means 811, download means 812, program and data accumulation means 813, and service information transmission means 814.

The respective constituent elements are explained as follows. First, the processing ability information hold means 711 has stored therein the processing ability information that regards the service information that the mobile station 7 can process. The processing ability confirmation means 712 performs comparison between the service information the mobile station 7 wants to process therein and the processing ability information held in the processing ability information hold means 711. When as a result the confirmation means 712 has determined that the mobile station 7 cannot process the service information, the confirmation means 712 outputs a download request signal to the base-station side server. The download request acceptance means 811 accepts the download request signal from the processing ability confirmation means 712 of the mobile station 37 to thereby output a download instruction signal.

The program and data accumulation means 813 has stored therein the program and data necessary for the mobile station 7 to process the service information, The download means 812, according to the download instruction signal from the download request acceptance means 811, gets the program and data necessary for the mobile station 7 to process the service information from the program and data accumulation means 813. Thereby, the download means 812 transmits them to the mobile station 7. The program and data reception means 713 receives the program and data transmitted from the download means 812, and stores its received program and data into the program and data hold means 714 to thereby cause them to be held therein. The service information receive means 716 outputs a transmission request signal for requesting the transmission of the service information to the base-station side server 8. In addition, the means 716 gets the service information that is return-transmitted on from the base-station side server 8. And, the means 716 notifies the contents of the service information to the processing ability confirmation means 712 and simultaneously hands its gotten service information to the program execution means 715. The program execution means 715 executes the program held in the program and data hold means 714 and thereby performs Processing of the service information and hands the resulting information to the service information display means 72. At this time, the program execution means 715, as the necessity arises, refers also to the data that is held in the program and data hold means 714. The service information display means 72 makes a display of the service information. On the other hand, the service information accumulation means 82 has stored therein the service information that can be supplied to the user between the base-station side server 8 and the mobile station 7. The service information transmission means 814 takes out from the service information accumulation means 82 the service information that the mobile station 7 requests to transmit, and then transmits it to the mobile station 7.

Figure 6:
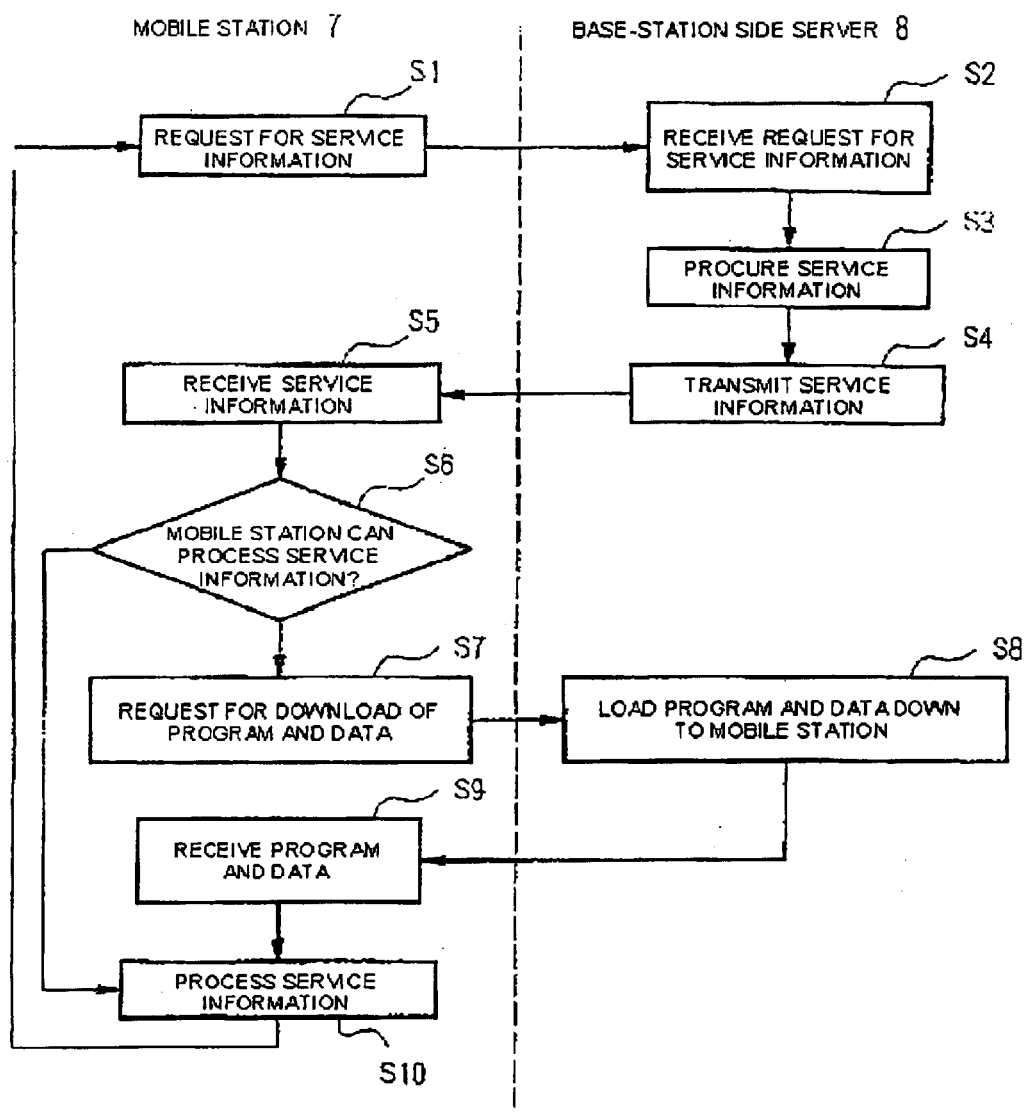
FIG. 6 is a flow chart illustrating the operation of the second embodiment.

Next, with reference to the flow chart of FIG. 6, the operation of the above-described embodiment will be explained in detail. Here, reference will now be made to a case where the mobile station capable of displaying the service information constructed of only character codes alone receives from the server the program and data necessary to display the service information constructed of only picture images alone. In this flow, the picture images are thereby made displayable on the mobile station. First, the mobile station 7 transmits a service information request signal from the service information receive means 716 to the base-station side server 8 (step S1 in FIG. 5). The base-station side server 8 receives the service request signal from the mobile station 7 by its service information transmission means 814 (step S2). The service information transmission means 814 procures the service information indicated by the service information request signal from the service information accumulation means 82 (step S3). The transmission means 814 then transmits it to the mobile station 7 (step S4) The mobile station 7, by its service information receive means 716, receives the service information and notifies that the contents of the service information are picture images, to the processing ability confirmation means 712. Simultaneously, the receive means 716 hands the service information to the program execution means 715 (step S5).

Next, the processing ability confirmation means 712 performs comparison between the information that the service information contains the picture images and the processing ability information of the mobile station 7 that is held in the processing ability information hold means 711. Thereby, the confirmation means 712 determines whether the mobile station 7 can process the service information (step S6). In this case, in the processing ability information hold means 711 there is stored the information indicating that only character codes alone can be processed. For this reason, the confirmation means 712 can determine that the mobile station 7 is unable to process the picture images ("NO" in step S6).

As a consequence, the confirmation means 712 transmits to the download request acceptance means 811 a request for download to the mobile station 7 of the program and data necessary to process the picture images (step S7) Using the download means 812, the download request acceptance means 811, which has received the request for download, takes out from the program and data accumulation means 813 the program and data necessary for the mobile station to process the picture images. Then, the download means 812 performs download with respect to the mobile station 7 (step S8). The mobile station 7, by its program and data reception means 713, receives the program and data from the base-station side server 8 and stores them into the program and data hold means 714 (step S9).

Next, the program execution means 715 performs processing of its received service information by the use of the program and data necessary to process the picture images that are held in the program and data hold means 714. Then, the program execution means 715 processes the received service information and displays the processed service information on the service information display means 72 (step S10).

The foregoing has given an explanation of the case where the mobile station cannot process the service information. However, if in step S6 it has been determined that the mobile station can process the service information ("YES" in step S6), the program execution means 715 performs processing of its received service information as this service information is. And then, the program execution means 715 displays the thus-processed service information on the service information display means 72 (step S10). Thereafter, each time a request for service information occurs from the mobile station, the same processing starting with the step S1 are executed repeatedly.

Also, the program for realizing the functions of the above-described mobile station 5 and base-station side server 6 illustrated in FIG. 3 or the functions of the above-described mobile station 7 and base-station side server 8 in FIG. 5 may be recorded in a computer-readable recording medium. And, the program that has been recorded in this recording medium may be read into a computer system (the mobile station 5, 7 or base-station side server 6, 8) and thereby executed in this computer system. By this execution of the program in such computer system, a program and data for making an additional service utilizable on the mobile station may be downloaded from the base station to the mobile station.

Here, the "computer system" is defined as including OS's and hardware such as peripheral equipment and, if it is of a type that utilizes WWW (World Wide Web) system, as further including home-page providing environments (or display environments). Also, the "computer-readable recording medium" means storage devices that include portable media such as floppy disks, photo-magnetic disks, ROM's, CD-ROM's, and hard disks contained in the computer system. Further, The "computer-readable recording medium" includes types (transmission media, or transmission waves) that, as in the case of transmitting a program via a network such as an Internet communication network or a communication line such as a telephone line, dynamically hold a program for a short period of time. As in the case of a volatile memory within the computer system that in that case becomes a server or a client, the "computer-readable recording medium" includes types, as well, that each hold a program for a prescribed period of time.

Also, this program may be one for realizing part of the above-described functions. Or this program may be one that can realize the above-described functions by being combined with the program already stored in the computer system, what is called "a differential file (a differential program)".

As has been described above, according to the first, third and fourth aspects of the present invention, the construction has been made so that, from the mobile station side to the base-station server side, the processing ability information of the mobile station is notified. And, each time a request for service information occurs from the mobile station, on the base station server side a comparison is performed between the processing ability information of the mobile station and the contents of the service information requested. As a result of this, on the base-station side server it becomes possible to determine whether the mobile station can process the service information. And if unable to process, an appropriate program and data can automatically be downloaded to the mobile station.

Also, according to the second, fifth and sixth aspects of the present invention, the construction has been made so that on the mobile station there is performed a comparison between the contents of the service information that the mobile station has requested to transmit and the processing ability information that the mobile station itself has. And, in the case the mobile station is unable to process the service station, this inability information is notified to the base station side server. As a result of this, the base station side server becomes able to know whether the mobile station can process the service information. Thereby, if unable to process, an appropriate program and data can automatically be downloaded to the mobile station.

For this reason, update of a program and data in the mobile station side that was conventionally performed through the intermediary of the user can automatically be performed between the mobile station and the base station side server. In addition, such update can be accurately performed without troubling the user to spend his time and labor therefor and without being accompanied by the user's mistakes in operation.

Although the invention has been described with respect to specific embodiment for complete and clear disclosure, the appended claims are not to be thus limited but are to be construed as embodying all modification and alternative constructions that may be occurred to one skilled in the art which fairly fall within the basic teaching here is set forth.

What is claimed is:

1. A mobile communication system including a mobile station and a server to communicate with the mobile station through a base station, the mobile station comprising:
   notification means for notifying data processing ability to the server beforehand;
   reception means for receiving a program and data from the server; and
   processing means for processing service information that the mobile station receives from the server using the program and data that the mobile station receives from the server, and the server comprising:
   storage means for storing the data processing ability that is notified from the mobile station;

determination means for receiving a request for the service information sent from the mobile station and for, according to the information stored in the storage means, determining whether the mobile station can process the service information or not; and transmission means for, when the result of the determination by the determination means is NO (negative), transmitting the program and data for processing the service information along with the service information to the mobile station.

2. A mobile communication system including a mobile station and a server to communicate with the mobile station through a base station, the mobile station comprising:

reception means for receiving service information as well as a program and data for processing the service information from the server;

determination means for determining whether the mobile station can process the service information received from the server or not;

means for, when the result of the determination by the determination means is No (negative), requesting the server to transmit the program and data for processing the service information; and processing means for processing the service information using the program and data that the mobile station receives from the server, and the server comprising:

first transmission means for, upon receipt of the request from the mobile station, transmitting the service information; and second transmission means for, upon receipt of the request from the mobile station, transmitting the program and data.

3. A program transmission method for performing program transmission between a mobile station and a server to communicate with the mobile station via a base station, comprising the steps of:

making the mobile station notify the data processing ability of the mobile station to the server beforehand;

when a request for service information occurs at the mobile station, making the mobile station transmit the request to the server; and making the server receive the request, according to the data processing ability of the mobile station that is notified to the server beforehand, making the server determine whether the mobile station can process the service information or not, and when the result of the determination is NO (negative), making the server transmit a program and data for processing the service information along with the service information.

4. A program transmission method for performing a program transmission between a mobile station and a server to communicate with the mobile station via a base station, comprising the steps of:

making the mobile station notify the data processing ability of the mobile station to the server beforehand;

when a request for service information occurs at the mobile station, making the mobile station transmit the request to the server;

making the server receive the request, according to the data processing ability of the mobile station that is notified to the server beforehand, making the server determine whether the mobile station can process the service information, and when the result of the determination is NO (negative), making the server transmit a program and data for processing the service information along with the service information;

making the mobile station store into the internal storage means the program and data that is transmitted from the server;

making the server transmit the service information to the mobile station; and making the mobile station that receives the service information process the service information using the program and data that is transmitted from the server.

5. A program transmission method for performing a program transmission between a mobile station and a server to communicate with the mobile station via a base station, comprising the steps of:

making the mobile station store its own data processing ability beforehand;

when a request for service information occurs at the mobile station, according to the data processing ability that the mobile station stores beforehand, making the mobile station determine whether the mobile station can process the requested service information, and when the result of the determination is NO (negative), making the mobile station request the server to transmit a program and data for processing the service information along with the service information; and making the server that receives the request transmit the program and data for processing the service information along with the requested service information to the mobile station.

6. A program transmission method for performing a program transmission between a mobile station and a server to communicate with the mobile station via a base station, comprising the steps of:

making the mobile station store its own data processing ability beforehand;

when a request for service information occurs at the mobile station, making the mobile station transmit the request to the server;

making the server that receives the request transmit the requested service information to the mobile station; and making the mobile station that receives the service information, according to the data processing ability the mobile station stores beforehand, making the mobile station determine whether the mobile station can process the service information or not, and when the result of the determination is NO (negative), making the mobile station request the server to transmit a program and data for processing the service information;

making the server that receives the request from the mobile station transmit the program and data to the mobile station; and making the mobile station process the service information using the program and data that is transmitted from the server.

7. A recording medium for storing a computer-readable program that is used in the program transmission between a mobile station and a server to communicate with the mobile station via a base station, the computer-readable program performing the processes of:

making the mobile station store its own data processing ability beforehand;

when a request for service information occurs at the mobile station, according to the data processing ability of the mobile station that the mobile station stores beforehand, making the mobile station determine whether the mobile station can process the requested service information; and when the result of the determination is NO (negative), making the mobile station request the server to transmit the service information and a program and data for processing the service information.

8. A recording medium for storing a computer-readable program that is used in the program transmission between a mobile station and a server to communicate with the mobile station via a base station, the computer-readable program performing the processes of:

making the mobile station store its own data processing ability beforehand;

when a request for service information occurs at the mobile station, making the mobile station transmit the request to the server;

making the mobile station receive the service information that is transmitted from the server;

according to the data processing ability of the mobile station that the mobile station stores beforehand, making the mobile station determine whether the mobile station can process the requested service information;

when the result of the determination is NO (negative), making the mobile station request the server to transmit a program and data for processing the service information; and making the mobile station process the service information using the transmitted program and data.

* * * * *